(12) United States Patent
Yamada et al.

(10) Patent No.: US 7,988,233 B2
(45) Date of Patent: Aug. 2, 2011

(54) SEAT RECLINING DEVICE

(75) Inventors: Yukifumi Yamada, Toyota (JP); Naoki Goto, Tokai (JP); Shinya Isobe, Nagoya (JP); Kazuhide Ishikawa, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/922,816

(22) PCT Filed: Jul. 2, 2009

(86) PCT No.: PCT/JP2009/062092
§ 371 (c)(1),
(2), (4) Date: Sep. 15, 2010

(87) PCT Pub. No.: WO2010/007895
PCT Pub. Date: Jan. 21, 2010

(65) Prior Publication Data
US 2011/0001346 A1    Jan. 6, 2011

(30) Foreign Application Priority Data

Jul. 15, 2008  (JP) ................................. 2008-183606

(51) Int. Cl.
*B60N 2/235*    (2006.01)
(52) U.S. Cl. ............... 297/367 P; 297/367 L; 297/367 R
(58) Field of Classification Search .............. 297/367 R, 297/367 P, 367 L
See application file for complete search history.

(56) References Cited

U.S. PATENT DOCUMENTS

| 5,622,407 | A  | * | 4/1997 | Yamada et al. ....... 297/367 R X |
| 6,474,740 | B1 |   | 11/2002 | Kondo et al. |
| 6,722,738 | B2 | * | 4/2004 | Uramichi .................. 297/367 R |
| 6,758,525 | B2 | * | 7/2004 | Uramichi ....................... 297/366 |
| 7,441,840 | B2 | * | 10/2008 | Yamada et al. ........... 297/367 R |
| 7,669,931 | B2 | * | 3/2010 | Tarusawa et al. ......... 297/367 L |
| 7,766,429 | B2 | * | 8/2010 | Kuroda et al. ............. 297/367 P |
| 2002/0043852 | A1 | * | 4/2002 | Uramichi ....................... 297/366 |
| 2007/0102982 | A1 | * | 5/2007 | Yamada et al. ........... 297/367 R |
| 2007/0108825 | A1 |   | 5/2007 | Yamada et al. |
| 2011/0012414 | A1 | * | 1/2011 | Yamada et al. ............. 297/367 P |
| 2011/0018325 | A1 | * | 1/2011 | Yamada et al. ........... 297/367 R |

FOREIGN PATENT DOCUMENTS

| JP | 2000 342368 | 12/2000 |
| JP | 2007 135797 | 6/2007 |
| JP | 2007 319459 | 12/2007 |

OTHER PUBLICATIONS

U.S. Appl. No. 12/944,281, filed Nov. 11, 2010, Yamada, et al.

* cited by examiner

*Primary Examiner* — Rodney B White
(74) *Attorney, Agent, or Firm* — Oblon, Spivak, McClelland, Maier & Neustadt, L.L.P.

(57) ABSTRACT

In a seat reclining device, a spiral spring includes an inner end portion engaged with the cam, an outer end portion engaged with the lower arm, and a wound portion formed by winding and provided between the inner end portion and the outer end portion. The outer end portion of the spiral spring includes a straight line portion extending consecutively from the wound portion and an accommodating portion includes a guide recessed portion accommodating the straight line portion therein and being in contact with the inner peripheral side surface of the straight line portion and being in contact with the outer peripheral side surface of the straight line portion at a further outer end than the contact point with the inner peripheral side surface.

9 Claims, 6 Drawing Sheets

SEAT RECLINING DEVICE

TECHNICAL FIELD

This invention relates to a seat reclining device for a vehicle seat, supporting a seat back relative to a seat cushion so that an angle of the seat back relative to the seat cushion can be adjustable.

BACKGROUND OF THE TECHNOLOGY

Conventionally, a seat reclining device of this type disclosed in, for example, the patent document 1 has been known. The seat reclining device according to the patent document 1 includes a lower arm supported at a seat cushion side and having a plurality of pawls, each having an outer toothed portion at a tip end thereof and an upper arm rotatably supported by the lower arm and at the same time fixed to a seat back side, the upper arm being formed with a plurality of inner toothed portions each being engageable with the outer toothed portions of the pawls. The reclining angle of the seat back can be adjustable by varying the engagement position between the inner and outer toothed portions.

In the seat reclining device disclosed in the patent document 1, in order to move the plurality of pawls outwardly in a radial direction, a lock mechanism is provided which includes a rotational cam and a spiral spring for rotationally biasing the cam in a direction in which the pawls are moved outwardly in a radial direction.

THE DOCUMENT OF CONVENTIONAL TECHNOLOGY

Patent Document

Patent Document 1: JP 2000-342368 A

DISCLOSURE OF THE INVENTION

Problems to be Solved by the Invention

The device disclosed in the patent document 1, as shown in FIG. 4 thereof, includes a spiral spring (5) disposed in a recessed portion (16) of a lower arm and an outer side end (51) of the spiral spring being engaged with an opening (14a) of the lower arm and an inner side end (52) thereof being engaged with an opening (32f) of the cam. However, the outer side end portion of the spiral spring and the opening of the lower arm are simply engaged with each other and accordingly the spiral spring is rotated making the opening of the lower arm to be a fulcrum point by the biasing force of the spiral spring. By this rotation, the outer periphery of the spiral spring may contact with the inner periphery of the lower arm, or mutually adjacently positioned wire rods of the spiral spring may contact with each other, which may increase the frictional resistance. Due to this increase of the frictional resistance, the spring force of the spiral spring may be decreased.

The present invention was made in consideration with solving the above problems and the object of the invention is to provide a seat reclining device which can prevent the outer periphery of the spiral spring from making contact with the inner periphery of the lower arm without adding structural components by keeping the spiral spring fixed on to the rotational axis line of the cam.

Means for Solving the Problem

The seat reclining device in a first aspect made for solving the above problem is features that a seat reclining device comprises a lower arm adapted to be fixed to a seat cushion side, an upper arm relatively rotatably supported by the lower arm and adapted to be fixed to a seat back side, a plurality of pawls disposed within the lower arm and movable in a radial direction guided by guide walls, and respectively having an outer toothed portion engageable with or disengageable from an inner toothed portion provided at an inner periphery of the upper arm, a cam having a cam surface to be in contact with a cam portion formed on the pawls and pressing the pawls in a direction in which the pawls are to be engaged with the inner toothed portion by rotation of the cam, a spiral spring for rotationally biasing the cam in one direction having an inner end portion engaged with the cam, an outer end portion engaged with the lower arm and a wound portion formed by winding and provided between the inner and outer end portions, and the outer end portion having a straight line portion extending consecutively from the wound portion, and an accommodating portion provided at the lower arm and having a guide recessed portion for accommodating the straight line portion of the spiral spring and being in contact with an inner peripheral side surface of the straight line portion and at the same time being in contact with an outer peripheral side surface of the straight line portion at a portion further outer end side than a contact portion with the inner peripheral side surface.

The seat reclining device in a second aspect features that, in the first aspect, the guide recessed portion includes a first projecting portion to be in contact with the outer peripheral side surface of the straight line portion and a second projecting portion provided opposite to the first projecting portion with respect to a wire rod of the spiral spring and being in contact with the inner peripheral side surface of the straight line portion at a position separated from the first projecting portion with a predetermined distance.

The seat reclining device in a third aspect features that, in the first aspect, the straight line portion of the spiral spring extends in a tangential direction of the wound portion and the spiral spring includes a bending portion to be in engagement with the guide recessed portion at a further outer end than the straight line portion.

BRIEF EXPLANATION OF ATTACHED DRAWINGS

FIG. 4 is a detail view of a first pawl and FIG. 4 (A) is a front view of the first pawl and FIG. 4(B) is a side view of the first pawl seen from the B-direction.

FIG. 5 is a detail view of a second pawl and FIG. 5 (A) is a front view of the second pawl and FIG. 5(B) is a side view of the second pawl seen from the B-direction.

THE EMBODIMENTS OF THE INVENTION

Figure 1:
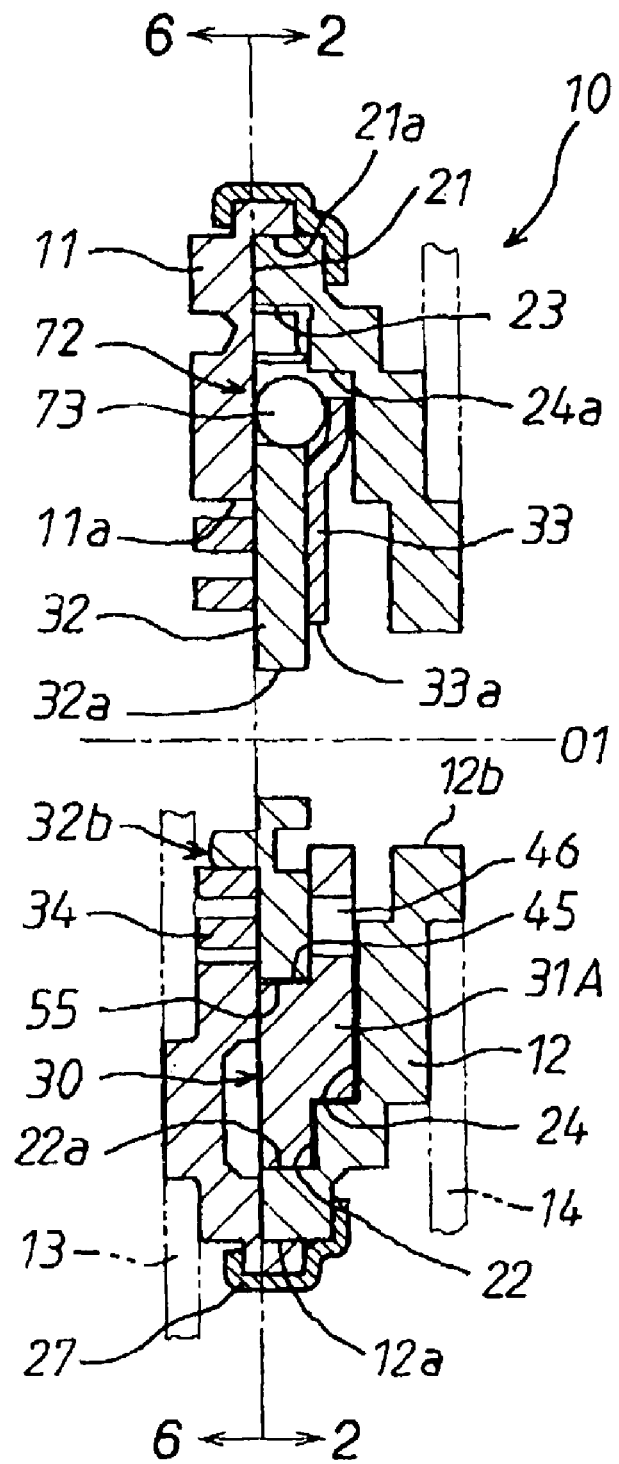
FIG. 1 is a cross sectional view of the seat reclining device according to an embodiment of the invention.

An embodiment of the present invention will be explained with reference to the attached drawings. The seat reclining device 10 for a vehicle includes, as shown in FIG. 1, a disc shaped lower arm 11 and a disc shaped upper arm 12. The lower arm 11 is fixed to a seat cushion frame 13 and the upper arm 12 is fixed to a seat back frame 14.

The lower arm 11 includes a circular shaped recessed portion 21 formed by half blanking and open to an upper arm 12 side and a through hole 11a at the central portion forming an accommodating portion for accommodating a spiral spring, which will be later explained in detail. The circular shaped recessed portion 21 of the lower arm 11 includes an inner peripheral surface 21a centering on the rotational axis line 01 of the upper arm 12 and the lower arm 11. The upper arm 12 is disposed in the lower arm 11 so that an outer peripheral surface 12a of the upper arm slidably contacts with the inner peripheral surface 21a of the lower arm 11.

On the other hand, the upper arm 12 includes a circular shaped recessed portion 22 formed by half blanking and open to the lower arm 11 side and a through hole 12b at the central portion thereof. The circular shaped recessed portion 22 of the upper arm 12 includes an inner peripheral surface 22a centering on the rotational axis line 01. The inner peripheral surface 22a of the circular shaped recessed portion 22 is provided with an inner toothed portion 23 along the entire inner periphery. A circular shaped recessed portion 24 is formed concentrically with the circular shaped recessed portion 22 by half blanking. Respective projections 25 are provided on the inner peripheral surface 24a of the circular shaped recessed portion 24 at two spaced portions in a circumferential direction projecting towards the rotational axis line 01.

A ring shaped metal plate holder 27 is inserted into the respective outer peripheral portions of the lower arm 11 and the upper arm 12 under the engaged condition of the outer peripheral surface 12a of the upper arm 12 having been inserted into the inner peripheral surface 21a of the circular shaped recessed portion 21 of the lower arm 11. The holder 27 serves as a retainer preventing disassembling in an axial direction of the lower and upper arms but allowing a relative rotational movement therebetween.

Figure 2:
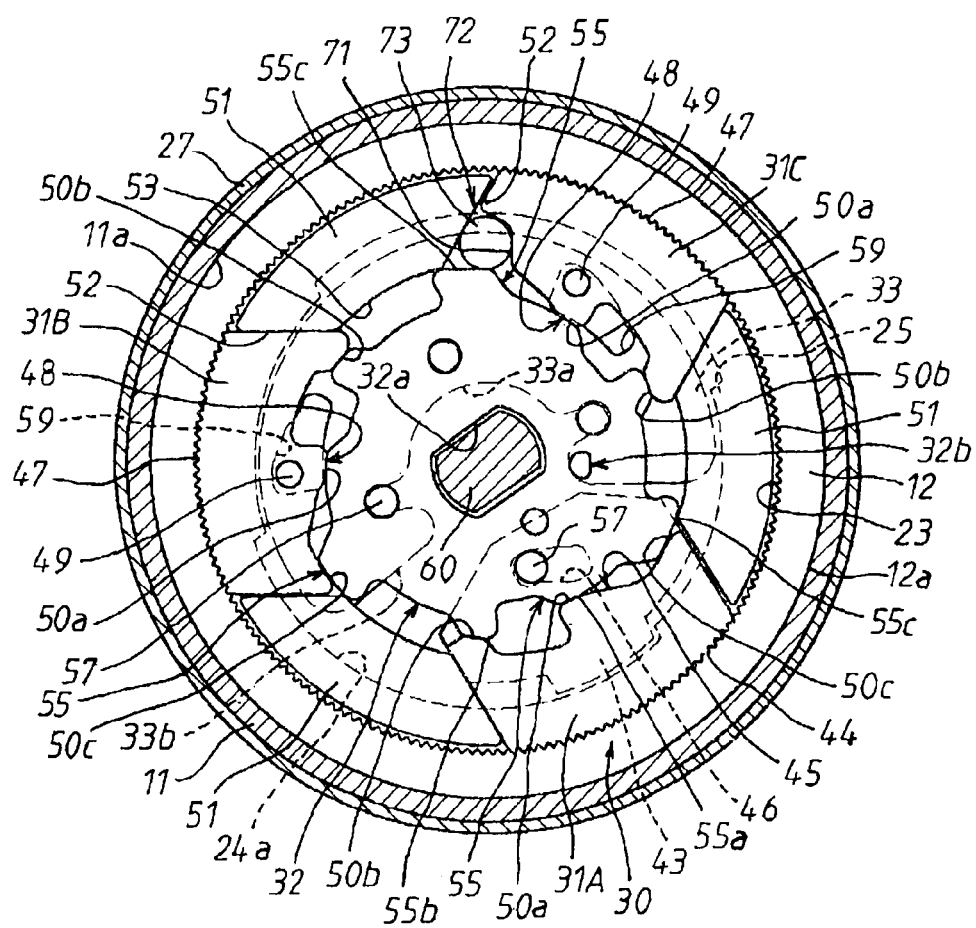
FIG. 2 is a cross sectional view taken along the line 2-2 in FIG. 1.
Figure 3:
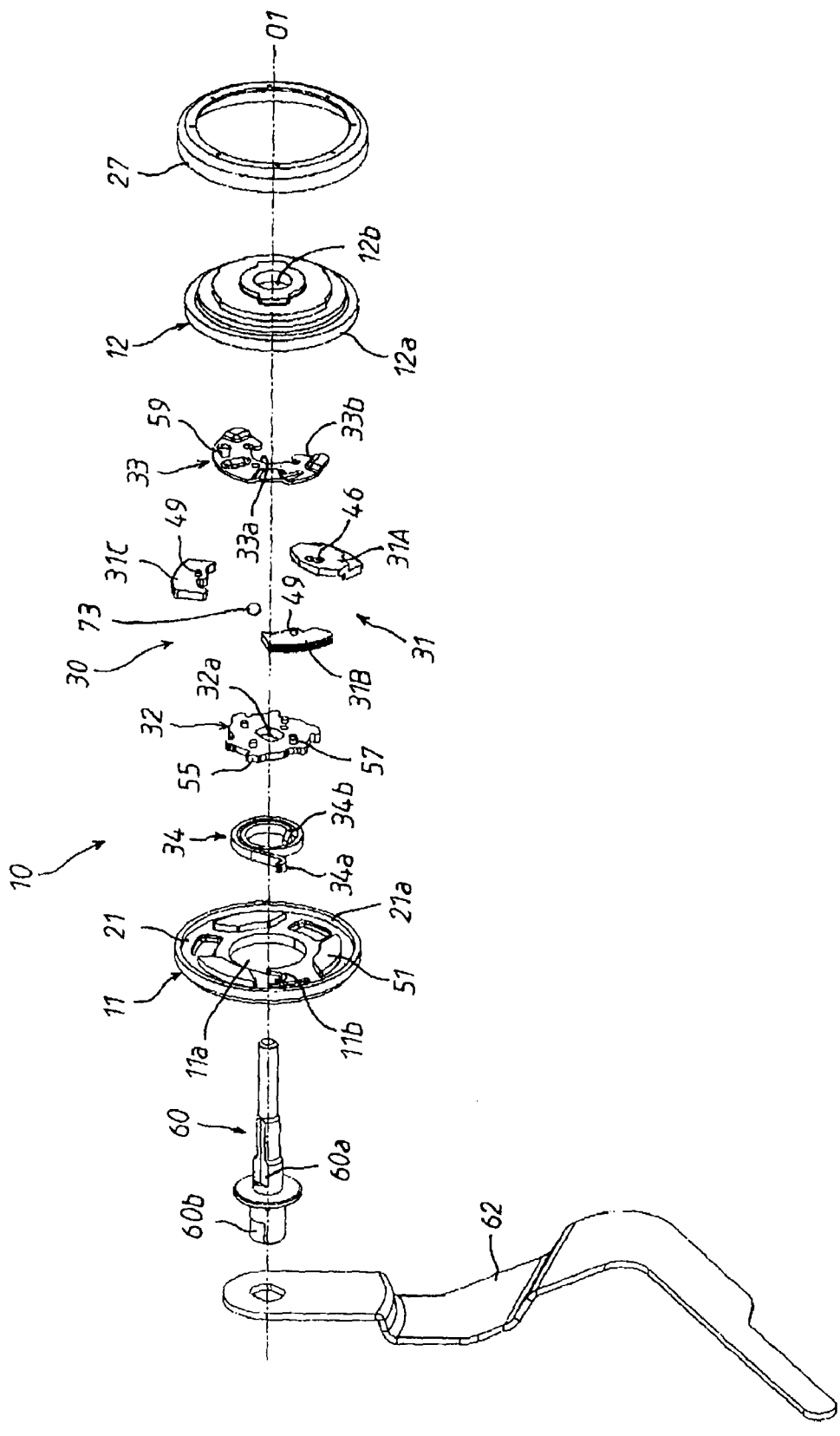
FIG. 3 is an exploded view of the seat reclining device shown in FIG. 1.

A lock mechanism 30 is provided between the lower and upper arms 11 and 12. The lock mechanism 30, as shown in FIGS. 2 and 3, is formed mainly by three pawls 31 (31A, 31B and 31C as will be explained later in detail) provided in a circumferential direction, a cam 32, a release plate 33 and a spiral spring 34, a biasing member, (See FIGS. 3 and 6). The pawls 31 are formed by three pawls of two types arranged in a plane perpendicular to the rotational axis line 01 with an equal angle distance with one another in a circumferential direction.

Figure 4:
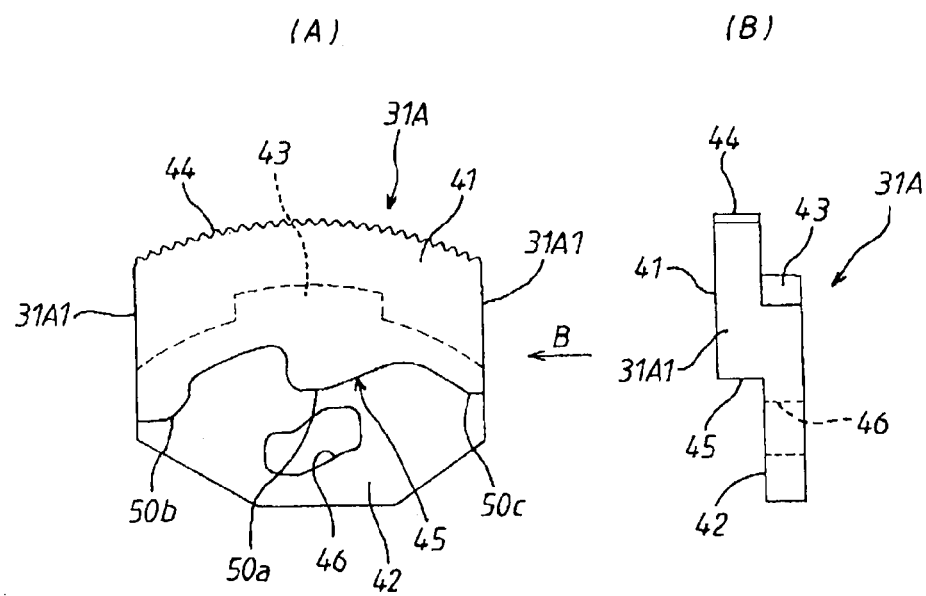

One of the pawls 31 (hereinafter referred to as a first pawl 31A) is formed by forging or like a steel and as shown in detail in. FIG. 4, includes a first block 41 and a second block 42 formed as a mutually stepwise shape as seen from the side view. As shown in FIG. 1, the first block 41 of the first pawl 31A is arranged at an inner peripheral surface 22a side of the upper arm 12 and the second block 42 is arranged at an axial center side of the upper arm 12. Both width end portions 31A1 of the first and the second blocks 41 and 42 agree with and are formed to be parallel planes. An outer toothed portion 44 is provided at an outer end (end surface opposing to the inner toothed portion 23 of the upper arm 12) of the first block 41 to be engageable with the inner toothed portion 23 of the upper arm 12 and an inner surface cam portion 45 is formed at an inner end (an end surface in a reverse direction of the outer end) of the first block 41 to be engageable with the outer periphery of the cam 32. Further, a pawl side groove cam portion 46 is provided at an approximately central portion in a width direction of the second block 42 and penetrating through the second block 42 in a thickness direction thereof.

On the other hand, the remaining two of the pawls 31 (hereinafter referred to as a second pawl 31B and a third pawl 31C) are formed by pressing or the like a steel plate and as shown in detail in FIG. 5, have a flat shape without having a stepped potion, which is similar to a shape formed only by the first block 41 wherein the second block 42 is cut off from the first pawl 31A. In other words, the second and third pawls 31B and 31C are shorter than the first pawl 31A in a radial direction by the length of the second block 42 and thinner in a thickness direction by the thickness of the second block 42. Similar to the first pawl 31A, both width end portions 31B1 are formed to be parallel planes. An outer toothed portion 47 is formed at the outer end of the second and third pawls 31B and 31C to be engageable with the inner toothed portion 23 of the upper arm 12. An inner surface cam portion 48 is provided at the second and third pawls, 31B and 31C to be engageable with the outer periphery of the cam 32. Further, an engaging projection 49 is provided at the central portion in a width direction at the second and third pawls 31B and 31C.

The shape of the inner surface cam portion 45 formed at the stepped portion of the first pawl 31A is formed to be the same shape of the inner surface cam portion 48 formed at the inner end of the second pawl 31B. In other words, as shown in FIGS. 4(A) and 5(B), the inner surface portions 45 and 48 are provided with three pressing portions 50a, 50b and 50c, upon which the cam surface 55 of the cam 32 acts, at the central portion in the circumferential direction and at both sides in circumferential direction of the first pawl 31A and the second pawl 31B, respectively. The pressing portion 50a provided at the central portion of the first pawl 31A and the second pawl 31B and the pressing portion 50b provided at a back side of the cam 32 in a locking rotational direction have an inclined surface which approaches towards the cam surface 55 of the cam 32 in response to the rotation in a locking rotational direction (clockwise direction as viewed in FIG. 2) of the cam 32. The pressing portion 50c provided at a front side of the cam 32 in a locking rotational direction has a circular surface centering on the rotation center of the cam 32.

The shape of the third pawl 31C is approximately the same with the shape of the second pawl 31B, but instead of having the pressing portion 50c of the second pawl 31B, a wedge operating portion 72 which will be later explained is provided. This is the only difference between the second and third pawls 31B and 31C in shape.

Figure 5:
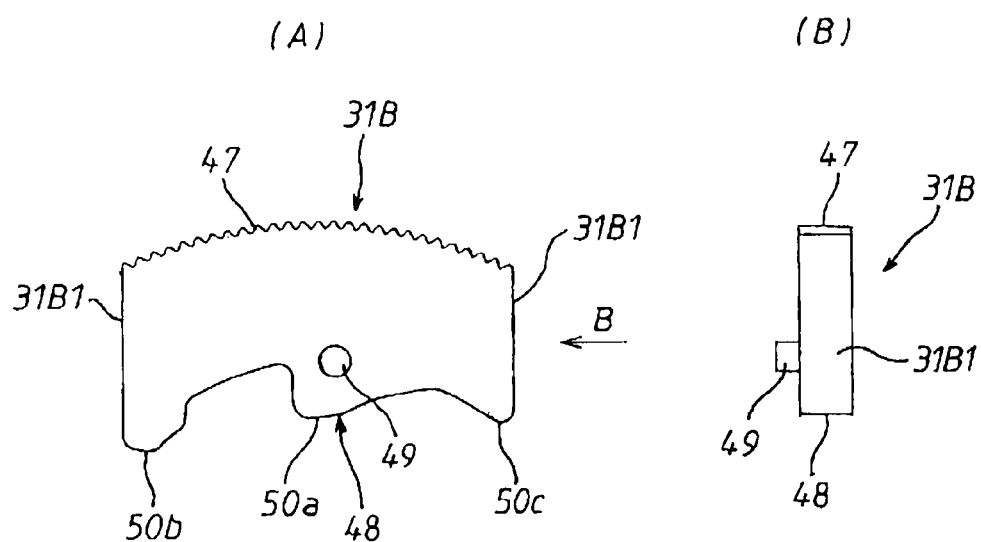

Three guide walls 51 are arranged in the circular shaped recessed portion 21 of the lower arm 11 with an equal angle distance from one another in a circumferential direction and a pair of oppositely provided parallel guide surfaces 52 are provided between the adjacently positioned two guide walls 51 for slidably guiding both width portions 31A1 and 31B1 (see FIGS. 4 and 5). Thus the first, second and third pawls 31A, 31B and 31C are slidably guided by the guide surfaces 52 of the guide walls 51 in a radial direction of the lower arm 11 and the upper arm 12 to have each outer toothed portion 44 and 47 engage with or disengage from the inner toothed portion 23. The circular surface 53 is provided at the inner periphery of the guide walls 51 centering on the rotational axis line 01.

An inclined surface 71 is formed in the third pawl 31C at one side surface of front side of a rotational direction of the cam 32 opposite to the guide surface 52 of the guide wall 51. The inclined surface 71 has a width continuously narrowing towards outside in a radial direction to be of a straight line shape. In other words, the distance between the guide surface 52 of the guide wall 51 and the inclined surface is gradually variable towards outside in a radial direction and a centerline between the guide surface 52 and the inclined surface 71 forms the wedge operating portion 72 towards the rotational axis line 01 of the cam 32. A wedge member 73 formed by a spherical member which is to be in contact with the guide surface 52 and the inclined surface 71 is provided at this wedge operating portion 72. The wedge member 73 is supported between the end surface of the circular recessed portion 21 of the lower arm 11 and a circumferential portion of a release plate 33 in an axial direction of the cam 32 and is movable in a radial direction by contacting with the guide surface 52 and the inclined surface 71. The wedge member 73 is pressed by the cam surface 55 of the cam 32, which will be explained later, outwardly in a radial direction and by the wedge operating portion 72, the third pawl 31C engaged with the upper arm 12 is moved relative to the guide wall 51 provided at the lower arm 11 in a direction mutually away from each other.

The cam 32 of the lock mechanism 30 is rotatably provided on the rotational axis line 01 within the circular recessed portion 22 of the upper arm 12 and includes a through hole 32a at the central portion. Further, the cam 32 includes three sets of cam surfaces 55 each separated from one another with an equal angle distance in a circumferential direction at the outer peripheral brim. One set of cam surfaces 55 is arranged to be engageable with each pressing portion 50a, 50b and 50c of the inner surface cam portion 45 of the first pawl 31A. One set of the remaining two sets of cam surfaces 55 is arranged to be engageable with each pressing portion 50a, 50b and 50c of the inner surface cam portion 48 of the second pawl 31B and the other one set of the remaining two sets is arranged to be engageable with each pressing portion 50a, 50b of the inner surface cam portion 48 of the third pawl 31C and the wedge member 73. The cam surface 55 may press upon a portion close to the engagement portion between the outer toothed portions 44 and 47 of the first, second and third pawls 31A, 31B and 31C and the inner toothed portion 23. Thus, the upper arm 12 can be securely locked to the lower arm 11 with a strong fixing force.

Each cam surface 55 includes three pressing cam portions 55a, 55b and 55c which are engageable with the pressing portions 50a, 50b and 50c of the first, second and third pawls 31A, 31B and 31C, respectively. The pressing cam portion 55c to be engageable with the wedge member 73 functions as a wedge pressing cam portion. When the cam 32 is rotated to reach a locking position, the three pressing cam portions 55a, 55b and 55c are maintained to respective angle positions to be in contact with the pressing portions 50a, 50b and 50c of the inner surface cam portions 45 and 48 of the first and the second pawls 31A and 31B and the pressing portions 50a and 50b of the inner surface cam portion 48 of the third pawl 31C and the wedge member 73. When the cam 32 is rotated to an unlocking position, the pressing cam portions 55a, 55b and 55c are separated from the pressing portions 50a, 50b and 50c and the wedge member 73 and at the same time the pressing cam portion (wedge pressing cam portion) 55c is maintained to an angle position to be engaged with the circular surface 53 of the guide wall 51.

A plurality of engaging projections 57 are provided with an equal angle distance separated from one another in a circumferential direction at the side surface of the cam 32. One of the engaging projections 57 is engaged with a pawl side groove cam portion 46 formed at the first pawl 31A. The engagement between the engaging projection 57 and the pawl side groove cam portion 46 functions to move the first pawl 31A inwardly in a radial direction by the rotation of the cam 32 in an unlocking direction.

A thin plate shaped release plate 33 is integrally attached by being engaged with the engaging projection 57 at the side surface of the cam 32. The release plate 33 includes a through hole 33a at the central portion thereof. The release plate 33 is attached to the cam 32 to agree with the second block 42 of the first pawl 31A in an axial line direction and is positioned facing the end surface of the second pawl 31B to be slidably movable thereon. Thus, the second and the third pawls 31B and 31C and the release plate 33 are housed within the thickness range of the first pawl 31A. The release plate 33 is formed by an approximately annular shaped plate to be in non-contact condition with the projection 25 formed at the upper arm 12. A sector recess 33b is formed at a portion of the annular shaped plate for disposing therein the first pawl 31A. In other words, the portion of the annular shaped plate is cut to form the sector shaped recess 33b with an angle range corresponding to the shape of first pawl 31A so that the release plate 33 may not interfere with the first pawl 31A upon rotation of the cam 32.

Two release plate side groove cam portions 59 are formed on the circumference of the release plate 33 centering on the rotation center and are penetrating through the release plate in a thickness direction. The release plate side groove cam portions 59 are arranged further outwardly in a radial direction than the circumferential position of the engaging projection 57 to oppse to the end surfaces of the second and third pawls 31B and 31C, respectively. Thus, the engaging projections 49 provided at the second and third pawls 31B and 31C are engaged with the release plate side groove cam portions 59, respectively. By this engagement between the engaging projections 49 and the release plate side groove cam portions 59, the second and third pawls 31B and 31C are moved inwardly in a radial direction when the release plate 33 is rotated in an unlocking direction together with the cam 32.

A hinge shaft 60 is provided on the rotational axis line 01 as shown in FIG. 3 and rotatably penetrates through the through holes 11a, 32a, 33a and 12b provided at the rotation centers of the lower arm 11, the cam 32, the release plate 33 and the upper arm 12, respectively. An engaging portion 60a having two flat surfaces is formed on the hinge shaft 60 at an approximately central portion in an axial direction. The through hole 32a of the cam 32 in which the hinge shaft 60 is inserted has an engaged portion having two flat surfaces to be engaged with the engaging portion 60a of the hinge shaft 60 for unitary rotation of the hinge shaft 60 and the cam 32. The through hole 32a of the cam 32, as shown in FIG. 2, is formed to be slightly larger than the engaging portion 60a of the hinge shaft 60 so that a gap in a radial direction is provided between the cam 32 and the hinge shaft 60. Accordingly, the cam 32 can be movable in a radial direction relative to the hinge shaft 60 within the circular shaped recessed portion 22 of the upper arm 12. Further, an engaging portion 60b having two flat surfaces is provided at one end of the hinge shaft 60 and an operating handle 62 is integrally attached to the hinge shaft 60 by the engagement of the engaging portion 60b of the hinge shaft 60 with an engaged bore having two flat surfaces formed on the handle 62.

Figure 6:
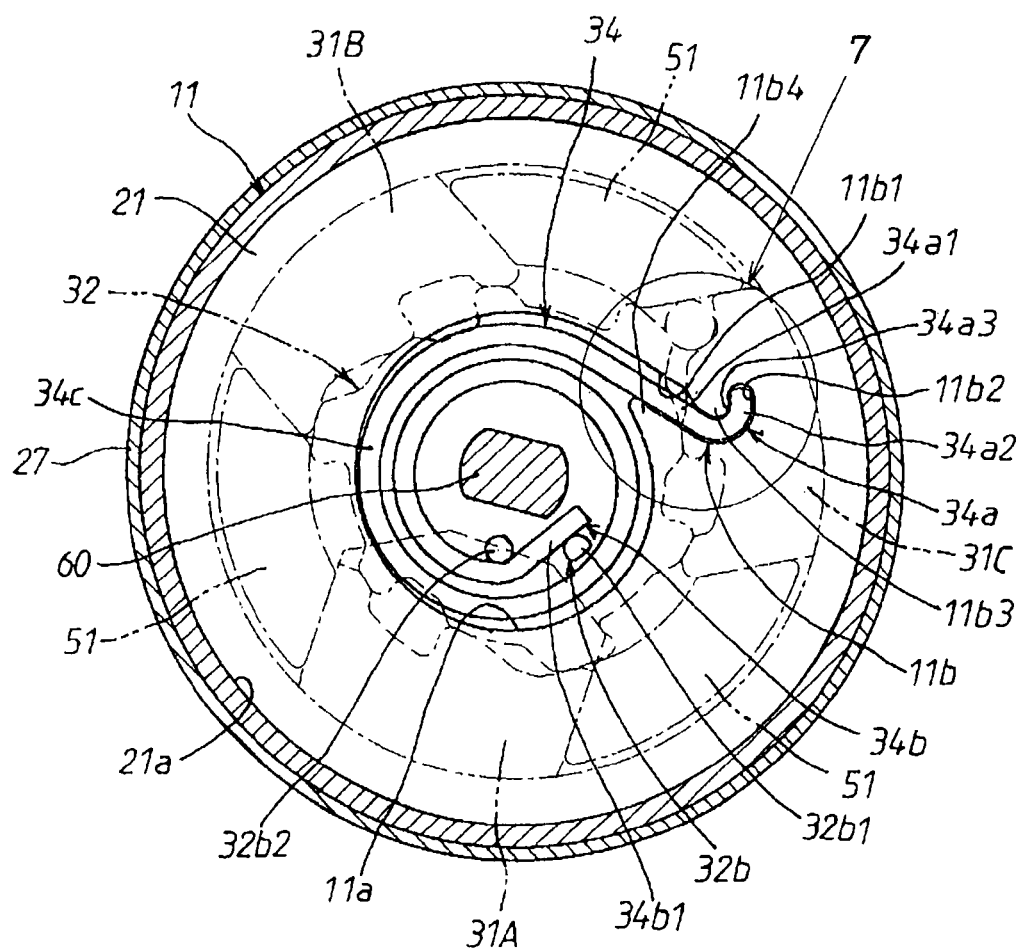
FIG. 6 is a cross sectional view taken along the line 6-6 in FIG. 1.

The spiral spring 34 rotatably biases the cam 32 in a direction in which the pawl 31 engages with the upper arm 12 and is disposed in the accommodating portion 11a of the lower arm 11. The spiral spring 34 is formed by bending and winding a flat wire rod of rectangular shape to a predetermined spiral shape as shown in FIG. 3 and FIG. 6 and is provided between the lower arm 11 and the cam 32. The spiral spring 34 is formed by an outer end portion 34a, an inner end portion 34b and a wound portion 34c formed by winding and provided between the outer and inner end portions 34a and 34b. The outer end portion 34a of the spiral spring 34 is engaged with the engaging portion 11b formed at the lower arm 11 and the inner end portion 34b is engaged with the engaging portion 32b provided at the end surface of the cam 32.

Figure 7:
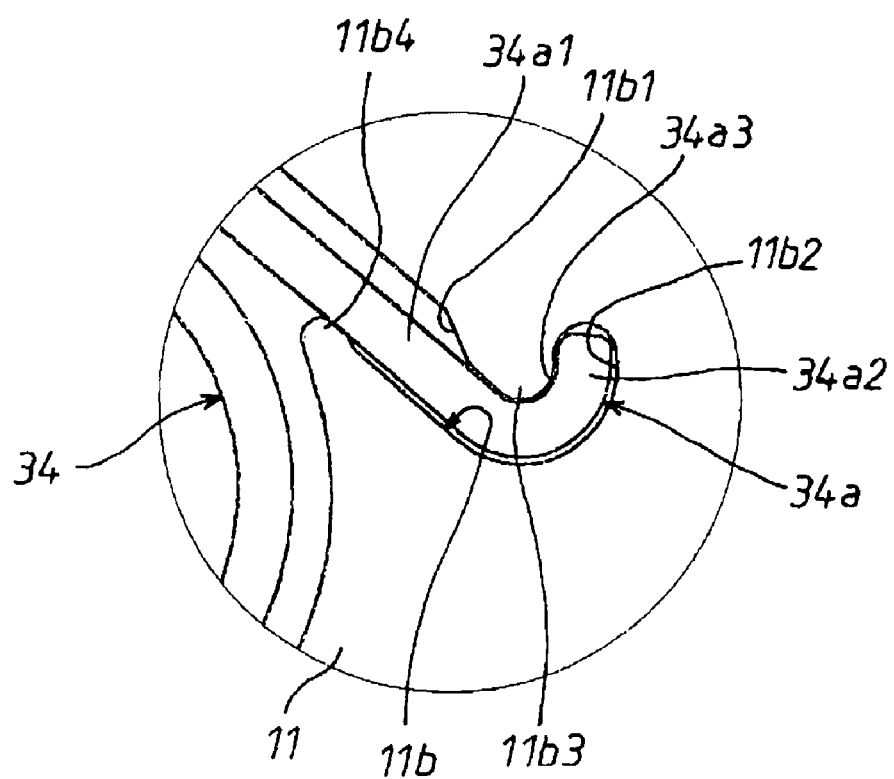
FIG. 7 is an enlarged view of an area indicated by numeral 7 in FIG. 6.

In other words, as shown in FIG. 7, the outer end portion 34a of the spiral spring 34 includes a straight line portion 34a1 extending in a tangential direction, a bending portion 34a2 formed at further outward than the straight line portion 34a1 and bent toward outside and a circular shaped recessed portion 34a3 formed at a connecting portion between the straight line portion 34a1 and the bending portion 34a2. As shown in FIG. 6, the inner end portion 34b of the spiral spring 34 includes a straight line shaped bent portion 34b1 slightly bent towards the central direction of the spiral spring 34.

On the other hand, the engaging portion 11b of the lower arm 11 to be engaged with the outer end portion 34a of the spiral spring 34 includes a guide recessed portion 11b1 extending in a tangential direction of the accommodating portion (through hole) 11a of the lower arm 11 and a bent recessed portion 11b2 bent from a tip end of the guide recessed portion 11b1. The straight line portion 34a1 of the outer end portion 34a of the spiral spring 34 is inserted into the guide recessed portion 11b1 and the bending portion 34a2 of the outer end portion 34a is inserted into the bent recessed portion 11b2. The guide recessed portion 11b1 is provided with a first projecting portion 11b3 to be in contact with the circular shaped recessed portion 34a3 formed at the connecting portion of the straight line portion 34a1 and the bending portion 34a2 of the spiral spring 34 and a second projecting portion 11b4 positioned opposite to the first projecting portion 11b3 with respect to the wire rod of the spiral spring 34 and being in contact with the straight line portion 34a1 of the outer end portion at the position separated from the first projecting portion 11b3 with a predetermined distance.

In other words, by inserting the bending portion 34a2 of the outer end portion 34a of the spiral spring 34 into the bent recessed portion 11b2 of the engaging portion 11b of the lower arm 11, the movement of the outer end portion 34a along the straight line portion 34a1 is prevented. Further, by making the inner peripheral side surface of the straight line portion 34a1 of the outer end portion 34a (inner peripheral side surface of the wound portion 34c) to be in contact with the second projecting portion 11b4 and at the same time by making the outer peripheral side surface of the straight line portion 34a1 (outer peripheral side surface of the wound portion 34c) to be in contact with the first projecting portion 11b3 at a potion further outer side than the contact portion with the inner peripheral side surface, the biasing force of the spiral spring 34 having a fulcrum point at the bending portion 34a2 is properly received in the lower arm and the axial center of the spiral spring 34 can be kept on the rotational axis line 01.

The engaging portion 32b of the cam 32 for engaging with the inner end portion 34b of the spiral spring 34 includes two projecting portions 32b1 and 32b2 as shown in FIG. 6 and the first projecting portion 32b1 is arranged to be engaged with the inner side of the connecting portion of the bent portion 34b1 of the inner end portion 34b and the wound portion 34c of the spiral spring 34 and the second projecting portion 32b2 is positioned opposite to the first projecting portion 32b1 with respect to the wire rod of the spiral spring 34 and is in contact with the tip end portion of the bent portion 34b1 at the position separated from the first projecting portion 32b1 with a predetermined distance.

The cam 32 receives a biasing force in a clockwise direction as viewed in FIG. 2 by engaging the outer end portion 34a of the spiral spring 34 with the engaging portion 11b of the lower arm 11 and at the same time by engaging the inner end portion 34b with the engaging portion 32b of the cam 32 under the situation wherein thus structured spiral spring 34 accumulates an spring force. In this case, the bending portion 34a2 of the outer end portion 34a of the spiral spring 34 is engaged with the bent recessed portion 11b2 of the engaging portion 11b of the lower arm 11 and both sides of the straight line portion 34a1 of the outer end portion 34a is engaged with the first and the second projecting portions 11b3 and 11b4 at positions separated with a predetermined distance. Thus, due to the spring force of the spiral spring 34, the spiral spring 34 generates a biasing force in a clockwise direction as viewed in FIG. 6 with the fulcrum point at the bending portion 34a2. Both sides of the straight line portion 34a1 are made in contact with the first and the second projecting portions 11b3 and 11b4 by the biasing force to securely keep the axial center of the spiral spring 34 to be fixed on the rotational axis line 01. As the result, the axial center position of the spiral spring 34 can continue to be in almost the same position as the original position even when the biasing force (elastic reaction force) changes due to the winding up of the spiral spring 34. This can prevent the outer periphery of the spiral spring 34 from making contact with the inner periphery of the through hole 11a of the lower arm 11 or can prevent mutual contact between the adjacently positioned wire rods of the spiral spring 34. As the result, the spring force of the spiral spring 34 would not be reduced by friction resistance or the like.

By the biasing force of thus structured spiral spring 34, the cam 32 is rotated in a locking rotational direction (clockwise direction as viewed in FIG. 2) relative to the lower arm 11. The cam surface 55 presses the first, second and third pawls 31A, 31B and 31C outwardly in a radial direction to engage the outer toothed portions 44 and 47 of the first, second and third pawls 31A, 31B and 31C with the inner toothed portion 23 of the upper arm 12.

Next, the operation of thus structured seat reclining device 10 will be explained.

FIG. 2 shows the locking condition of the seat reclining device 10. Under this condition, the pressing cam portions 55a and 55b of the cam 32 engage with the inner cam surface portions 45 and 48 of the first, second and third pawls 31A, 31B and 31C, respectively to push the first, second and third pawls 31A, 31B and 31C outwardly in a radial direction. Then, the outer toothed portions 44 and 47 of the first, second and third pawls 31A, 31B and 31C engage with the inner toothed portion 23 of the upper arm 12 to restrict the rotation of the upper arm 12 relative to the lower arm 11. In this case, since the cam 32 is movable in a radial direction relative to the hinge shaft 60 within the circular shaped recessed portion 21, the cam 32 can press the three pawls 31 (31A, 31B and 31C) with approximately equal pressing force. Accordingly, the upper arm 12, and consequently, the seat back frame 14 can be surely locked without generating rattling.

In this case, the bending portion 34a2 of the outer end portion 34a of the spiral spring 34 is engaged with the bent recessed portion 11b2 of the engaging portion 11b of the lower arm 11 and accordingly, the movement of the spiral spring 34 along the straight line portion 34a1 can be restricted and since the both sides of the straight line portion 34a1 of the outer end portion 34a are engaged with the first and the second projecting portions 11b3 and 11b4 at the positions separated with the predetermined distance, the both sides of the straight line portion 34a1 are made in contact with the first and the second projecting portions 11b3 and 11b4 by the spring force of the spiral spring 34 to fixedly keep the spiral spring 34 on to the rotational axis line 01. As the result, the spiral spring 34 is kept to the original spiral shape and this can prevent the outer periphery of the spiral spring 34 from making contact with the lower arm 11 or can prevent mutual contact between the adjacently positioned wire rods of the spiral spring 34. As the result, the spring force of the spiral spring 34 would not be reduced by friction resistance or the like.

Further, the wedge member 73 provided at the wedge operating portion 72 formed between the third pawl 31C and the guide wall 51 is pressed outwardly in a radial direction by the pressing cam portion 55c of the cam 32. By this wedge operation, the third pawl 31C and the guide surface 52 of the guide wall 51 receive the force in a direction in which both are mutually separated. Thus the lower arm 11 provided with the guide wall 51 and the upper arm 12 engaged with the pawl 31 are relatively rotated and respective gaps on the circumference between the first, second and third pawls 31A, 31B and 31C and the guide walls 51 can be eliminated to prevent the rattling of the seat back (seat back frame 14) with respect to the seat cushion (seat cushion frame 13).

Further, the wedge operating portion 72 is arranged in front side of locking rotational direction and accordingly, the wedge operation generates gaps between the cam 32 and the pawls 31 in response to the movement of the third pawl 31C in a direction away from the wedge operating portion 72. By thus generated gaps, the cam 32 can be further rotated in a locking direction to avoid instable locking condition which may be derived from the provision of the wedge operating portion 72.

Under this condition, when the hinge shaft 60 is rotated in a counterclockwise direction as viewed in FIG. 2 by operating the operating handle 62, the cam 32 and the release plate 33 are unitarily rotated against the biasing force of the spiral spring 34. By this, the engagement of the inner surface cam portions 45 and 48 of the first, second and third pawls 31A, 31B and 31C with the pressing cam portions 55a and 55b of the cam surface 55 are released and the pressing cam portions 55c are moved in a direction not to interfere with the inner surface cam portions 45 and 48 and at the same time the engagement of the pawl side groove cam portion 46 of the first pawl 31A with the engaging projection 57 of the cam 32 pulls the first pawl 31A towards the rotational axis line 01 side along the guide surface 52 of the guide wall 51 to release the engagement between the outer toothed portion 44 of the first pawl 31A and the inner toothed portion 23. Further at the same time, the engagement of the release plate side groove cam portion 59 with the engaging projections 49 of the second and the third pawls 31B and 31C pulls the second and the third pawls 31B and 31C towards the rotational axis line 01 side along the guide surface 52 of the guide wall 51 to release the engagement between the outer toothed portion 47 of the second and the third pawls 31B and 31C and the inner toothed portion 23.

Accordingly, the seat back supported by the seat back frame 14 can be rotated to any angular position relative to the seat cushion supported by the seat cushion frame 13. Since the three sets of pressing cam portions 55c of the cam 32 are engaged with the inner peripheral surface 53 of the guide wall 51, respectively, the center of the cam 32 is adjusted by the inner peripheral surface 53 of the guide wall 51. As the result, the gaps between the outer toothed portions 44 and 47 of the first, second and third pawls 31A, 31B and 31C and the inner toothed portion 23 are adjusted to be approximately equal to one another to prevent a faulty rotational movement and any possible generation of abnormal noise caused by the interference the tip end of one pawl 31 with the tip end of the inner toothed portion 23.

Further, under the condition that the lock has been released, if the seat back (seat back frame 14) is rotated further forwardly than a predetermined angular position relative to the seat cushion (seat cushion frame 13), in other words, rotated into a so-called front tilted angle range, the projection 25 formed on the inner periphery of the circular shaped recessed portion 24 of the upper arm 12 positions between the engaging portion 43 of the first pawl 31A and the inner toothed portion 23. In other words, the first pawl 31A is prevented from the outward movement in a radial direction by the engagement of the engaging portion 43 thereof with the projection 25 of the upper arm 12. Under this condition, when the operating handle 62 is released, the cam 32 presses the first pawl 31A in a direction to be engaged with the inner toothed portion 23 by the functional force of the spiral spring 34. However, the movement of the first pawl 31A is prevented by the engagement of the projection 25 of the upper arm 12 with the engaging portion 43 of the first pawl 31A and accordingly, the first pawl 31A cannot come into an engagement with the inner toothed portion 23. At the same time the movement of the first pawl 31A in a radial direction is prevented and consequently, the rotation of the cam 32 is prevented. Thus the release plate 33 is not rotated and the second and the third pawls 31B and 31C are kept to a non-engaging position separated from the inner toothed portion 23 by the release plate side groove cam portion 59. Thus, the seat back can be freely rotatable without being locked in the front tilted angle range.

The operating lever 62 is operated to return the seat backward so that the seat is returned to the optimum position to be seated from the front tilted angle position, and then the operator releases the hand from the operating handle 62, the first, second and third pawls 31A, 31B and 31C, the cam 32 and the release plate 33 are returned to the respective positions shown in FIG. 2 and the seat becomes locked condition.

According to the embodiment above, the outer end portion 34a of the spiral spring 34 for rotationally biasing the cam 32 in one direction includes the straight line portion 34a1 extending consecutively from the wound portion 34c, the accommodating portion (through hole) 11a provided at the lower arm 11 includes the guide recessed portion 11b1 accommodating the straight line portion 34a1, contacting with the inner peripheral side surface of the straight line portion 34a1 and at the same time contacting with the outer peripheral side surface of the straight line portion 34a1 at an outer end portion side further outside than the contacting point with the inner peripheral side surface. According to the structure, the spiral spring 34 is prevented from the movement along the straight line portion 34a1 of the outer end portion 34a and is properly fixed to the rotational axis line 01 of the cam 32. As the result, by rotating the spiral spring 34 with the outer end portion 34a as the fulcrum point the outer periphery of the spiral spring 34 can be properly prevented from making contact with the inner periphery of the accommodating portion 11 to effectively transmit the biasing force of the spiral spring 34 to the cam 32.

Further, according to the embodiment, the guide recessed portion 11b1 includes the first projecting portion 11b3 to be in contact with the outer peripheral side surface of the straight line portion 34a1 and the second projecting portion 11b4 disposed opposite to the first projecting portion 11b3 across the wire rod of the spiral spring 34 and in contact with the inner peripheral side surface of the straight line portion 34a at the position separated from the first projecting portion 11b3 with a predetermined distance. Thus, the biasing force of the spiral spring 34 is surely received at the two points, first projecting portion 11b3 and the second projecting portion 11b4.

Further, according to the embodiment, the straight line portion 34a of the spiral spring 34 extends in a tangential direction of the wound portion 34c and the spiral spring 34 includes the bending portion 34b at a further outer end than the straight line portion to be in contact with the guide recessed portion 11b1. Accordingly, the space for the accommodating portion 11a (guide recessed portion 11b1) can be largely saved. Since any bending portion with an axial center different from those of the bending portion and the wound portion is not generated between the wound portion 34a and the straight line portion 34a, the displacement of the axial center of the spiral spring 34 due to the change of biasing force can be prevented and also the interference of the outer periphery of the spiral spring 34 (wound portion 34c) with the inner periphery (inner peripheral surface of the accommodating portion) of the lower arm 11 can be suitably prevented. And yet, a loosening out of the straight line portion 34a1 from the guide recessed portion 11b1 can be prevented by providing the bending portion 34b.

According to the embodiment, the first projecting portion 11b3 and the second projecting portion 11b4 are formed on the guide recessed portion 11b1 of the lower arm 11 so that the straight line portion 34a1 of the outer end portion 34a of the spiral spring 34 can be in contact with at least at two portions thereof. However, any structure can be made without providing the first and the second projecting portions 11b3 and 11b4 as long as the straight line portion 34a1 can be in contact with at least at two portions. For example, the guide recessed portion 11b1 can be formed with a straight line shaped recessed portion so that the entire both sides of the straight line portion 34a1 can be in contact therewith.

Further, according to the embodiment, the plurality of pawls 31 are formed with two types, first pawl 31A type and second pawl 31B type. However, all the pawls can be formed by one single type, first pawl 31A type. Then, consequently, the release plate 33 can be eliminated. The number of pawl 31 is not limited to three (3) and four (4) or more pawls may be provided on the circumference of the circle.

According to the embodiment, the outer end portion of the spiral spring which rotationally biases the cam in one direction includes the straight line portion consecutively extending from the wound portion and the accommodating portion provided at the lower arm which includes the guide recessed portion for accommodating the straight line portion and being in contact with the inner peripheral side surface of the straight line portion and at the same time being in contact with the outer peripheral side surface of the straight line portion at the position further at an outer end side than a contact portion with the inner peripheral side surface. According to this structure, the spiral spring is restricted in its movement along the straight line portion of the outer end portion and is securely fixed on the rotational axis line of the cam. As the result, by rotating the spiral spring with the outer end portion as the fulcrum point the outer periphery of the spiral spring can be properly prevented from making contact with the inner periphery of the accommodating portion to effectively transmit the biasing force of the spiral spring to the cam.

And, according to the embodiment, the glide recessed portion includes a first projecting portion to be in contact with the outer peripheral side surface of the straight line portion and a second projecting portion provided opposite to the first projecting portion with respect to the wire rod of the spiral spring and being in contact with the inner peripheral side surface of the straight line portion at the position separated from the first projecting portion with a predetermined distance. Accordingly, the biasing force of the spiral spring can be received properly at the first and the second projecting portions.

Further, according to the embodiment, the straight line portion of the spiral spring extends in a tangential direction of the wound portion and the spiral spring includes a bending portion to be in engagement with the guide recessed portion at a further outer end than the straight line portion. Accordingly, the space for the accommodating portion (a guide recessed portion) can be saved. Since any bending portion with an axial center different from those of the bending portion and the wound portion is not generated between the wound portion and the straight line portion, the displacement of the axial center of the spiral spring due to the change of biasing force can be prevented and also the interference of the outer periphery of the spiral spring (a wound portion) with the inner periphery (an inner peripheral surface of the accommodating portion) of the lower arm can be suitably prevented. And yet, a loosening out of the straight line portion from the guide recessed portion can be prevented by providing the bending portion.

The invention have been explained in accordance with the above embodiment, however, the invention is not limited to the structure explained by the embodiment and various changes or modifications can be made within the scope of the appended claims.

INDUSTRIAL APPLICABILITY

The seat reclining device according to the invention can be adapted to a vehicle seat wherein a seat back is angularly adjustably supported to a seat cushion.

EXPLANATION OF REFERENCE NUMERALS

10: seat reclining device, 11: lower arm, 11a: accommodating portion (through hole), 11b: engaging portion, 11b1: guide recessed portion, 11b2: bent recessed portion, 11b3: first projecting portion, 11b4: second projecting portion, 12: upper arm, 13: seat cushion frame, 14: seat back frame, 23: inner toothed portion, 30: lock mechanism, 31 (31A, 31B and 31C): pawl, 32: cam, 32b: engaging portion, 33: release plate, 34: spiral spring, 34a: outer end portion, 34a1: straight line portion, 34a2: bending portion, 34b: inner end portion, 34c: wound portion, 44, 47: outer toothed portion, 45, 48: inner surface cam portion, 51: guide wall, 55: cam surface, and 60: hinge shaft.

The invention claimed is:

1. A seat reclining device comprising:
a lower arm adapted to be fixed to a seat cushion side;
an upper arm relatively rotatably supported by the lower arm and adapted to be fixed to a seat back side;
a plurality of pawls disposed within the lower arm and movable in a radial direction by guide walls, and respectively having an outer toothed portion engageable with or disengageable from an inner toothed portion provided at an inner periphery of the upper arm;
a cam having a cam surface to be in contact with a cam portion formed on the pawls and pressing the pawls in a direction in which the pawls are to be engaged with the inner toothed portion by rotation of the cam;
a spiral spring for rotationally biasing the cam in one direction having an inner end portion engaged with the cam, an outer end portion engaged with the lower arm and a wound portion formed by winding and provided between the inner end portion and the outer end portion, and the outer end portion having a straight line portion extending consecutively from the wound portion in a tangential direction of the wound portion; and
an accommodating portion provided at the lower arm and having a guide recessed portion for accommodating the straight line portion of the spiral spring and being in contact with an inner peripheral side surface of the straight line portion and at the same time being in contact with an outer peripheral side surface of the straight line portion at a portion farther toward an outer end side than a contact point with the inner peripheral side surface.

2. The seat reclining device according to claim 1, wherein the guide recessed portion includes a first projecting portion to be in contact with the outer peripheral side surface of the straight line portion and a second projecting portion provided opposite to the first projecting portion with respect to a wire rod of the spiral spring and being in contact with the inner peripheral side surface of the straight line portion at a position separated from the first projecting portion with a predetermined distance.

3. The seat reclining device according to claim 2, wherein the spiral spring includes a bending portion to be in engagement with the guide recessed portion at a farther outer end than the straight line portion.

4. The seat reclining device according to claim 3, wherein the spiral spring includes a circular shaped recessed portion between the bending portion and the straight line portion.

5. The seat reclining device according to claim 4, wherein the first projecting portion contacts the spiral spring at the circular shaped recessed portion.

6. The seat reclining device according to claim 3, wherein the bending portion bends toward the outer peripheral side of the straight line portion.

7. The seat reclining device according to claim 1, wherein the spiral spring includes a bending portion to be in engagement with the guide recessed portion at a farther outer end than the straight line portion.

8. The seat reclining device according to claim 7, wherein the spiral spring includes a circular shaped recessed portion between the bending portion and the straight line portion.

9. The seat reclining device according to claim 7, wherein the bending portion bends toward the outer peripheral side of the straight line portion.

\* \* \* \* \*